(12) United States Patent
Fang et al.

(10) Patent No.: US 12,039,115 B2
(45) Date of Patent: Jul. 16, 2024

(54) DISPLAY PANEL AND ELECTRONIC DEVICE

(71) Applicant: Wuhan China Star Optoelectronics Semiconductor Display Technology Co., Ltd., Wuhan (CN)

(72) Inventors: Liang Fang, Wuhan (CN); Ding Ding, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/623,545

(22) PCT Filed: Dec. 20, 2021

(86) PCT No.: PCT/CN2021/139809
§ 371 (c)(1),
(2) Date: Jun. 22, 2023

(87) PCT Pub. No.: WO2023/108694
PCT Pub. Date: Jun. 22, 2023

(65) Prior Publication Data
US 2024/0045529 A1    Feb. 8, 2024

(30) Foreign Application Priority Data

Dec. 13, 2021  (CN) .......................... 202111520533.9

(51) Int. Cl.
*G06F 3/041* (2006.01)
*G06F 3/044* (2006.01)

(52) U.S. Cl.
CPC ........ *G06F 3/0412* (2013.01); *G06F 3/04164* (2019.05); *G06F 3/044* (2013.01)

(58) Field of Classification Search
CPC ..... G06F 3/0412; G06F 3/04164; G06F 3/044
See application file for complete search history.

(56) References Cited

U.S. PATENT DOCUMENTS

| | | | |
|---|---|---|---|
| 11,379,068 B1 * | 7/2022 | Kim | .................... G06F 3/04164 |
| 2021/0064172 A1 | 3/2021 | Lee | |
| 2022/0300116 A1 * | 9/2022 | Zhang | .................. G06F 3/0446 |

FOREIGN PATENT DOCUMENTS

| | | |
|---|---|---|
| CN | 104699290 A | 6/2015 |
| CN | 111583808 A | 8/2020 |

(Continued)

OTHER PUBLICATIONS

International Search Report in International application No. PCT/CN2021/139809, mailed on Sep. 14, 2022.

(Continued)

*Primary Examiner* — Peter D McLoone
(74) *Attorney, Agent, or Firm* — PV IP PC; Wei Te Chung; Zhigang Ma

(57) ABSTRACT

A display panel and electronic device are provided. The display panel comprises a plurality of touch signal lines, a plurality of display signal lines, a plurality of first-type signal shielding lines, and a plurality of first power lines. The first-type signal shielding line is arranged in the non-display area, and the first-type signal shielding line is located between the touch signal line and the display signal line. The first power line is connected to a fixed voltage signal, and the first-type signal shielding line is electrically connected to the first power lines respectively on both sides of the bending sub-area.

20 Claims, 4 Drawing Sheets

(56) References Cited

FOREIGN PATENT DOCUMENTS

| | | |
|---|---|---|
| CN | 113157143 A | 7/2021 |
| CN | 113325971 A | 8/2021 |

OTHER PUBLICATIONS

Written Opinion of the International Searching Authority in International application No. PCT/CN2021/139809, mailed on Sep. 14, 2022.

* cited by examiner

DISPLAY PANEL AND ELECTRONIC DEVICE

CROSS-REFERENCE TO RELATED APPLICATION

This application is a national phase application under 35 U.S.C. § 371 of PCT Application No. PCT/CN2021/139809, filed Dec. 20, 2021, which claims priority to Chinese Application No. 202111520533.9, filed Dec. 13, 2021, the contents of which are incorporated herein by reference in their entirety.

FIELD OF THE DISCLOSURE

The present disclosure relates to the field of display technology, and in particular to a display panel and an electronic device.

BACKGROUND

At present, display panels mainly include liquid crystal display panels, plasma display panels, organic electroluminescence panels, and active matrix organic electroluminescence panels. Display panels have broad application in vehicles, mobiles phones, tablets, computers, and TV products. Generally speaking, a touch function has become one of the standard configurations of most display panels. Among them, capacitive touch screens are widely used. The basic principle of the capacitive touch screen is to use tools such as fingers or stylus to generate capacitance with the touch screen. The electrical signal formed by a capacitance change before and after the touch is used to confirm whether the panel is touched and confirm the coordinates to be touched.

An important touch technology of a capacitive touch panel is self-capacitive, and touch control lines of a common touch structure are routed together in the lower-end peripheral area. In a bending area, the routing of touch control lines and the routing of display lines are designed in a same layer of metal. In order to reduce signal interference, a signal shielding line is arranged between the display line and touch control line. However, as the number of display and touch segments increases, the number of signal shielding lines increases in corresponding to demand, resulting in an increase in the number of pads connected to a touch-control chip, which in turn resulting in an increase in the cost of the display panel and a reduction of the process yield.

Therefore, it is necessary to propose a new technical solution to the above-mentioned technical problems.

SUMMARY

One objective of an embodiment of the present disclosure is to provides a display panel and an electronic device to reduce the production cost of the display panel.

According to an embodiment of the present disclosure, the present disclosure provides a display panel having a display area and a non-display area, the non-display area comprising a bending sub-area, and the display panel comprises:
  a plurality of touch signal lines that are located in the display area and the non-display area;
  a plurality of display signal lines that are located in the display area and the non-display area;
  a plurality of first-type signal shielding lines that are arranged in the non-display area, each of the first-type signal shielding line being located between the touch signal line and the display signal line; and,
  a plurality of first power lines that are located in the display area and the non-display area and are connected to a fixed voltage signal;
  wherein, the first-type signal shielding lines are electrically connected to the first power lines respectively on both sides of the bending sub-area.

According to an embodiment of the present disclosure, the non-display area comprises a first power line sub-region, and the first power line is located in the first power line sub-region, spaced from part of the touch signal lines and the display signal lines which are located in the power line sub-region, and in a same layer with parts of the display signal line and the touch signal line which are located in the bending sub-area.

According to an embodiment of the present disclosure, at least parts of the first-type signal shielding line, the touch signal line, and the display signal line are arranged in the same layer.

According to an embodiment of the present disclosure, the display panel comprises:
  a substrate;
  an active layer, a first gate insulating layer, a first gate, a second gate insulating layer, a second gate and an interlayer dielectric layer which are stacked in sequence, wherein the interlayer dielectric layer is provided with a through hole, and the through hole penetrates at least the interlayer dielectric layer, the second gate insulating layer and the first gate insulating layer, and the display signal line covers at least a part of the side wall of the through hole;
  a first source/drain metal layer being disposed on the interlayer dielectric layer, the first source/drain metal layer comprising a source electrode, a drain electrode, and a first part of the first power line;
  a first planarization layer covering the first source/drain metal layer and filling the through hole;
  a second source/drain metal layer that is located on the first planarization layer and comprises a connecting electrode, a second part of the first power line, a third part of the first power line, wherein the first part of the first power line and the second part of the first power line are connected by a first via; and
  a second planarization layer being disposed on the first planarization layer.

In the display panel provided in the embodiment of the present disclosure, the first-type signal shielding line is electrically connected to the first power line through a second via hole.

In the display panel provided in the embodiment of the present disclosure, the display panel further comprises:
  a touch-control chip that is located on one side of the non-display area away from the display area, connected to the touch signal line, and used for providing a touch signal to the touch signal line; and
  a control chip that is located on one side of the non-display area away from the display area, wherein the control chip is connected to the display signal line and the first power line, the first-type signal shielding line is electrically connected to the control chip through the first power line, and the control chip is used to provide a display signal for the display signal line and the fixed voltage signal for the first power line In the display panel provided in the embodiment of the present disclosure, the non-display area comprises:

a second-type signal shielding line that is located in the non-display area and arranged around the display area, wherein a first end of the second-type signal shielding line is connected to the first touch-control chip, and a second end of the second-type signal shielding line is connected to the second touch-control chip.

In the display panel provided by the embodiment of the present disclosure, the touch signal lines comprise a first-type touch signal line and a second-type touch signal line, and the first-type touch signal line is connected to the touch-control chip over the first power line sub-region, and the second-type touch signal line is connected to the touch-control chip over the second power line sub-region.

In the display panel provided in the embodiment of the present disclosure, the touch-control chip comprises a first touch-control chip and a second touch-control chip, the first touch-control chip and the second touch-control chip are located on both sides of the control chip, the first-type touch signal lines and the second-type touch signal lines located on one side of the center line of the display panel are connected to the first touch-control chip, and the first-type touch signal lines and the second-type touch signal lines located on the other side of the center line of the display panel are connected to the second touch-control chip.

In the display panel provided in the embodiment of the present disclosure, the display panel further comprises:
a second-type signal shielding line that is located in the non-display area and arranged around the display area, wherein a first end of the second-type signal shielding line is connected to the first touch-control chip, and a second end of the second-type signal shielding line is connected to the second touch-control chip.

In the display panel provided in the embodiment of the present disclosure, the display panel further comprises a plurality of touch units that are arranged in the display area. The ends of the touch signal lines away from the touch-control chip are connected to the touch units, and the touch signal lines are connected to the touch units in a one-to-one correspondence.

In the display panel provided in the embodiment of the present disclosure, the first-type signal shielding line is arranged in parallel with the display signal line.

The embodiment of the present disclosure also provides an electronic device, the electronic device is provided with a display panel and a housing, the display panel is disposed in the housing, and the display panel comprises:
a plurality of touch signal lines that are located in the display area and the non-display area;
a plurality of display signal lines that are located in the display area and the non-display area;
a plurality of first-type signal shielding lines that are arranged in the non-display area, each of the first-type signal shielding line being located between the touch signal line and the display signal line; and,
a plurality of first power lines that are located in the display area and the non-display area and are connected to a fixed voltage signal;
wherein the first-type signal shielding lines are electrically connected to the first power lines respectively on both sides of the bending sub-area.

In the electronic device provided in the embodiment of the present disclosure, the non-display area comprises a first power line sub-region, and the first power line is located in the first power line sub-region, spaced from part of the touch signal lines and the display signal lines which are located in the power line sub-region, and in a same layer with parts of the display signal line and the touch signal line which are located in the bending sub-area.

In the electronic device provided in the embodiment of the present disclosure, at least parts of the first-type signal shielding line, the touch signal line, and the display signal line are arranged in the same layer.

In the electronic device provided in the embodiment of the present disclosure, the display panel comprises:
a substrate;
an active layer, a first gate insulating layer, a first gate, a second gate insulating layer, a second gate and an interlayer dielectric layer which are stacked in sequence, wherein the interlayer dielectric layer is provided with a through hole, and the through hole penetrates at least the interlayer dielectric layer, the second gate insulating layer and the first gate insulating layer, and the display signal line covers at least a part of the side wall of the through hole;
a first source/drain metal layer being disposed on the interlayer dielectric layer, the first source/drain metal layer comprising a source electrode, a drain electrode, and a first part of the first power line;
a first planarization layer covering the first source/drain metal layer and filling the through hole;
a second source/drain metal layer that is located on the first planarization layer and comprises a connecting electrode, a second part of the first power line, a third part of the first power line, wherein the first part of the first power line and the second part of the first power line are connected by a first via; and
a second planarization layer being disposed on the first planarization layer.

In the electronic device provided in the embodiment of the present disclosure, the first-type signal shielding line is electrically connected to the first power line through a second via hole.

In the electronic device provided in the embodiment of the present disclosure, the display panel further comprises:
a touch-control chip that is located on one side of the non-display area away from the display area, connected to the touch signal line, and used for providing a touch signal to the touch signal line; and,
a control chip that is located on one side of the non-display area away from the display area, wherein the control chip is connected to the display signal line and the first power line, the first-type signal shielding line is electrically connected to the control chip through the first power line, and the control chip is used to provide a display signal for the display signal line and the fixed voltage signal for the first power line.

In the electronic device provided in the embodiment of the present disclosure, the non-display area comprises:
a second power line sub-region that is located on at least one side of the first power line sub-region and distributed with a plurality of second power lines.

In the electronic device provided in the embodiment of the present disclosure, the touch signal lines comprise a first-type touch signal line and a second-type touch signal line, and the first-type touch signal line is connected to the touch-control chip over the first power line sub-region, and the second-type touch signal line is connected to the touch-control chip over the second power line sub-region.

The embodiment of the present disclosure provides a display panel and an electronic device. The display panel comprises a plurality of touch signal lines, a plurality of display signal lines, a plurality of first-type signal shielding lines, and a plurality of first power lines. Specifically, the touch signal lines are located in the display area and the non-display area. The display signal lines are located in the display area and the non-display area. The first-type signal shielding lines are arranged in the non-display area, and the first-type signal shielding line is located between the touch signal line and the display signal line. The first power line is located in the display area and the non-display area, and the first power line is connected to a fixed voltage signal, and the first-type signal shielding line is connected to the first power line on both sides of the bending sub-area. In the display panel provided in the embodiment of the present disclosure, by means of arranging the first-type signal shielding line between the touch signal line and the display signal line, connecting the first-type signal shielding line to a fixed voltage signal, and arranging the first-type signal shielding line to be electrically connected to the first power line on both sides of the bending sub-area, the first-type signal shielding line and the first power line have the same voltage signal, and there is no need to add a pad to connect the first signal shielding line into the control chip or the touch-control chip. Furthermore, since the first power line is connected to a DC signal source, the corresponding capacitance and a voltage difference thereof are constant, so the corresponding signal interference is constant. Therefore, the signal interference can be removed through the chip, and effective signal data can be retained, thereby preventing signal crosstalk between the display signal line and the touch signal line. In addition, the number of pads for connecting into the touch-control chip is reduced, thereby reducing the production cost of the display panel, and improving the process yield.

In order to make the above-mentioned content of the present disclosure more comprehensible, the preferred embodiments will be specifically described below in conjunction with the accompanying drawings, which are described in detail as follows.

BRIEF DESCRIPTION OF THE DRAWINGS

Some example embodiments of the present invention will be described below in detail with reference to the accompanying drawings.

DETAILED DESCRIPTION

Figure 1:
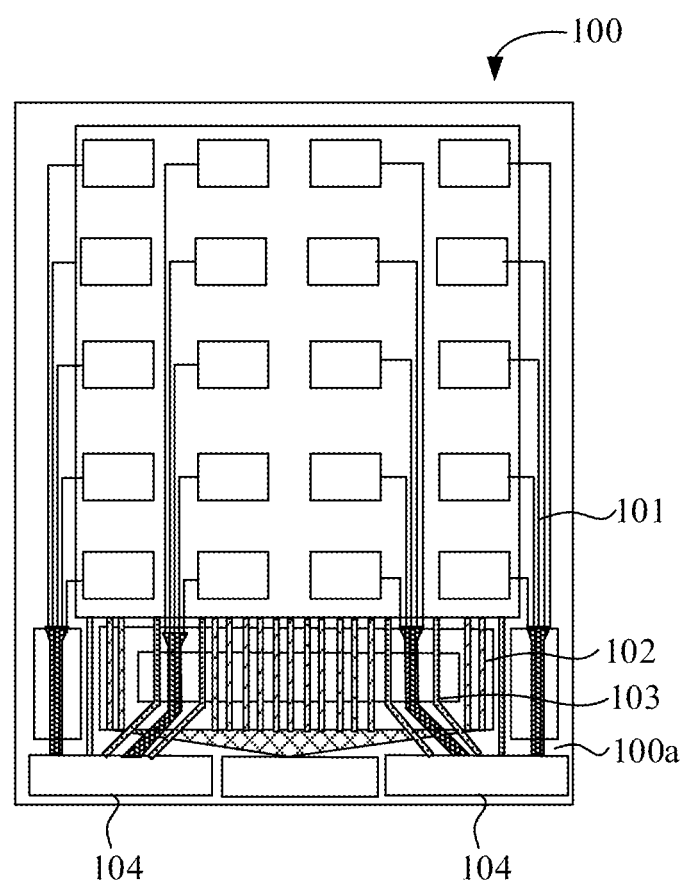
FIG. 1 is a schematic diagram of a planar structure of a display panel in the art.

The above and other aspects and features of the present invention will be described more fully hereinafter with reference to the accompanying drawings, in which example embodiments of the present inventions are shown. While some example embodiments of the present invention have been described using specific terms, such description is for illustrative purposes, and it is to be understood that changes and variances may be made without departing from the spirit or scope of the following claims. Further, it should be understood that parts, which are not essential to a complete understanding of the present invention, may be omitted in the drawings for clarity of description. Like reference numerals are used to idea iffy like elements throughout different drawings.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the terra "and/or" includes any and all combinations of one or more of the associated listed items. Expressions such as "at least one of" when preceding a list of elements, modify the entire list of elements and do not modify the individual elements of the list. Further, the use of "may" when describing embodiments of the inventive concept refers to "one or more embodiments of the inventive concept."

Please refer to FIG. 1. FIG. 1 is a schematic diagram of a planar structure of a display panel in the art. Generally speaking, the touch function has become one of the standard configurations of most display panels, wherein capacitive touch screens are widely used. The basic principle of the capacitive touch screen is to use tools such as fingers or stylus to generate capacitance with the touch screen. The electrical signal formed by the capacitance change before and after the touch is used to confirm whether the panel is touched and confirm the coordinates to be touched. An important touch technology of capacitive touch panels is self-capacitive. As shown in FIG. 1, touch signal lines 101 of a common touch structure route together in the lower-end peripheral area 100a. In the peripheral area 100a, the touch signal line 101 and the display signal line 102 are arranged in a same layer of metal. In order to reduce signal interference, a signal shielding line 103 is arranged between the display signal line 102 and the touch signal line 101. However, as the number of display and touch segments increases, the number of signal shielding lines 103 increases in corresponding to demand, resulting in an increase in the number of pads connected into the touch integrated circuit 104, as well as an increase in the cost of the display panel 100 and a reduction of the process yield.

In view of the high cost of the existing display panel 100 and the low yield of the manufacturing process, the embodiment of the present disclosure provides a display panel for reducing the manufacturing cost of the display panel and improving the yield of the manufacturing process.

Figure 2:
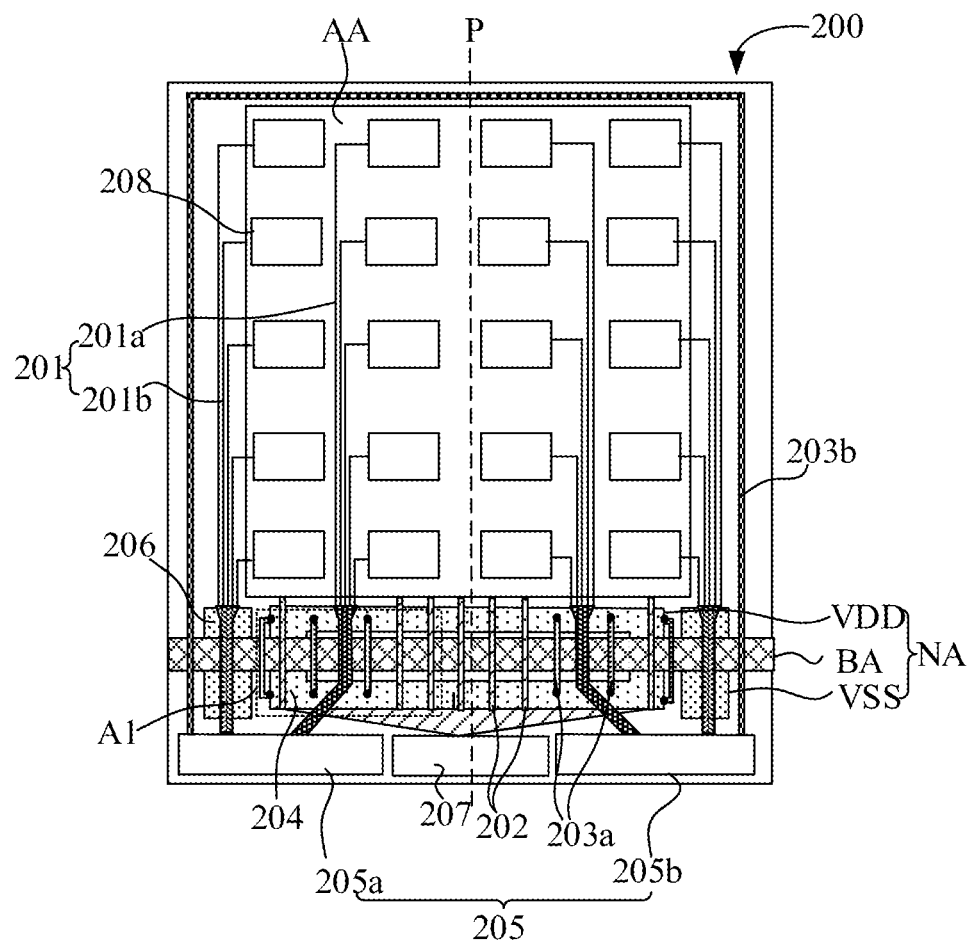
FIG. 2 is a schematic diagram of the planar structure of the display panel provided in the embodiment of the present disclosure.

Please refer to FIG. 2. FIG. 2 is a schematic diagram of a plane structure of a display panel provided by an embodiment of the application. The embodiment of the present disclosure provides a display panel 200. The display panel 200 is provided with a display area AA and a non-display area NA, and the non-display area NA comprises a bending sub-area BA. The display panel 200 comprises a plurality of touch signal lines 201, a plurality of display signal lines 202, a plurality of first-type signal shielding lines 203a, and a plurality of first power lines 204. Specifically, the touch signal line 201 is located in the display area AA and the non-display area NA. The display signal line 202 is located in the display area AA and the non-display area NA. The first-type signal shielding line 203a is arranged in the non-display area NA, and the first-type signal shielding line 203a is located between the touch signal line 201 and the display signal line 202. The first power line 204 is located in the display area AA and the non-display area NA, and the first power line 204 is connected to a fixed voltage signal, wherein the first-type signal shielding line 203a is connected to the first power line 204 respectively at both sides of the bending sub-area BA.

In the display panel 200 provided in the embodiment of the present disclosure, the first-type signal shielding line 203a is arranged between the touch signal line 201 and the display signal line 202, the first-type signal shielding line 203a is connected to a fixed voltage signal, and the first-type signal shielding line 203a is connected to the first power line 204 at both sides of the bending sub-area BA. Therefore, the first-type signal shielding line 203a and the first power line 204 have the same voltage to be applied. It is not necessary to use an external pad (Pad) on the control chip or touch-control chip to connect the first signal shielding line 203a. Since the first power lines 204 is connected to a DC signal source, a corresponding capacitance and voltage difference would be constant, and thus a corresponding signal interference is also constant. Therefore, a signal interference can be removed by the chip so as to retain valid signal or data, thereby preventing signal crosstalk between the display signal line 202 and the touch signal line 201. In addition, there is no need to connect the first-type signal shielding line 203a into the touch-control chip, which reduces the number of pads connected into the touch-control chip, thereby reducing the production cost of the display panel and improving the process yield.

It should be noted that the non-display area NA in the embodiment of the present disclosure may be located on at least one side of the display area AA. It should be understood that the non-display area NA in the embodiment of the present disclosure is a routing area.

Figure 3:
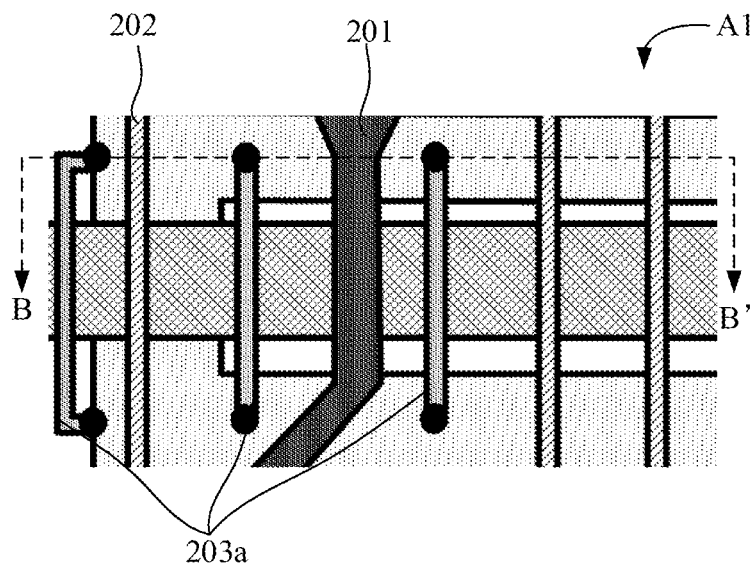
FIG. 3 is a partial enlarged view of FIG. 2.
Figure 4:
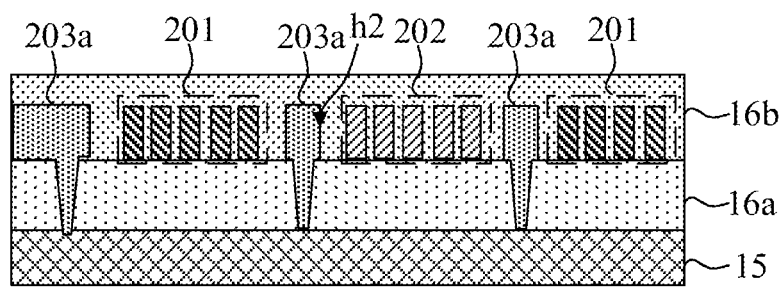
FIG. 4 is a cross-sectional view of FIG. 3 along the B-B' line.
Figure 5:
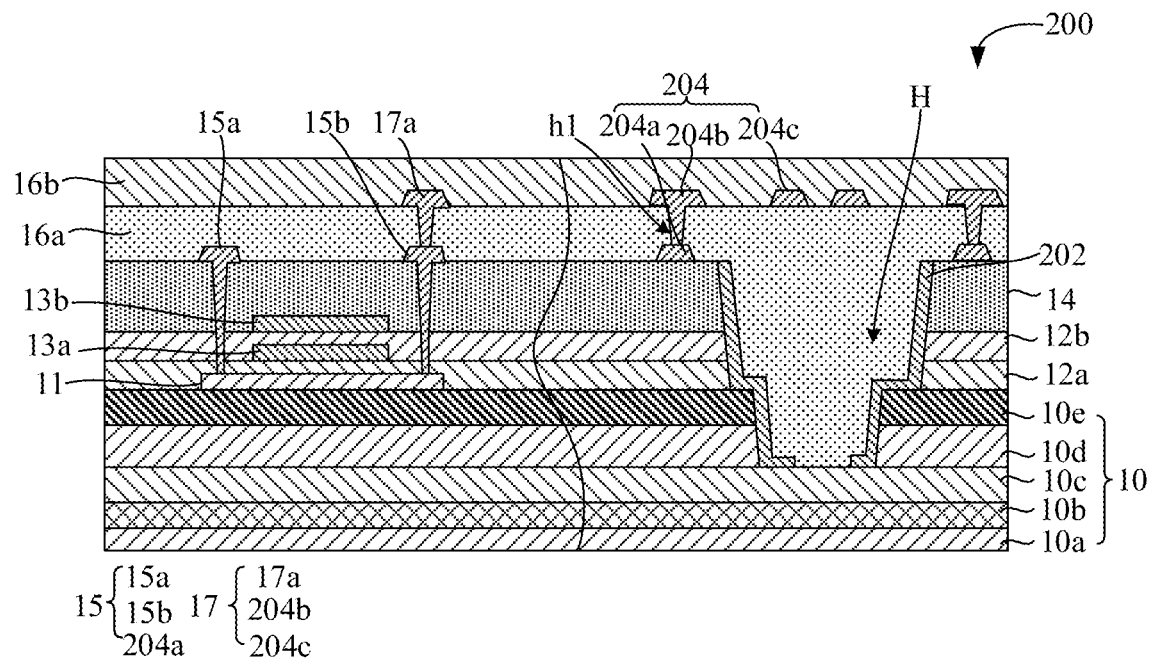
FIG. 5 is a schematic diagram of the structure of the display panel provided by the embodiment of the present disclosure.
Figure 6:
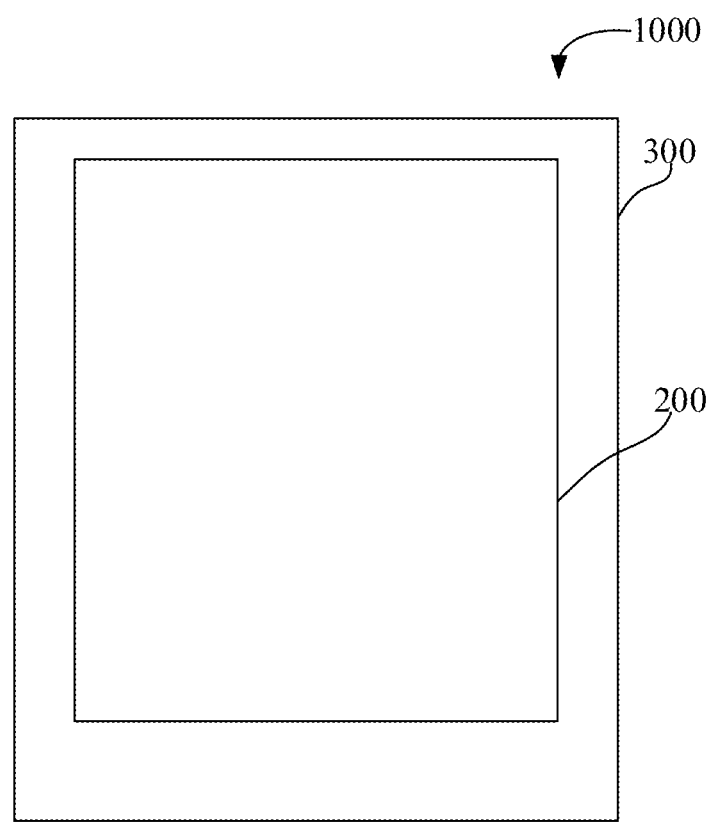
FIG. 6 is a schematic diagram of the planar structure of the electronic device of the embodiment of the present disclosure.

Please refer to FIG. 2, FIG. 3, FIG. 4, and FIG. 5. FIG. 3 is an enlarged view of the display panel provided in FIG. 2 in the area A1. FIG. 4 is a cross-sectional view of FIG. 3 along the B-B' line. FIG. 5 is a schematic diagram of the structure of the display panel provided by the embodiment of the present disclosure. In some embodiments, the non-display area NA comprises a first power line sub-region VDD. The first power line 204 is located in the first power line sub-region VDD and is spaced from the touch signal line 201 and the display signal line 202 allocated in the first power line sub-region VDD. The first power line 204 is also arranged in a same layer with parts of the display signal line 202 and the touch signal line 201 which are located in the bending sub-area BA. At least parts of the first-type signal shielding line 203a, the touch signal line 201, and the display signal line 202 are arranged in the same layer. Since the parts of the display signal line 202 and the touch signal line 201 in the bending sub-area BA are arranged in the same layer, the display signal line 202 and the touch signal line 201 which are adjacent are prone to have signal crosstalk. Therefore, according to the embodiment of the present disclosure, a first-type signal shielding line 203a is provided between the display signal line 202 and the touch signal line 201 to prevent the occurrence of signal crosstalk between the display signal line 202 and the touch signal line 201. In addition, since the first-type signal shielding line 203a, at least parts of the touch signal line 201 and the display signal line 202 are arranged in the same layer, the process of producing the first-type signal shielding line 203a, the touch signal line 201 and the display signal line 202 are simplified.

The display panel 200 comprises, stacked in sequence, a substrate 10, an active layer 11, a first gate insulating layer 12a, a first gate 13a, a second gate insulating layer 12b, a second gate 13b, an interlayer dielectric layer 14, a first source/drain metal layer 15, a first planarization layer 16a, a second source-drain metal layer 17, and a second planarization layer 16b. The interlayer dielectric layer 14 is provided with a through hole H, and the through hole H penetrates at least the interlayer dielectric layer 14, the second gate insulating layer 12b and the first gate insulating layer 12a. The display signal line 202 covers at least part of the sidewall of the through hole H. The first source/drain metal layer 15 is disposed on the interlayer dielectric layer 14. The first source/drain metal layer 15 comprises a source electrode 15a, a drain electrode 15b, and a first portion 204a of the first power lines 204. The first planarization layer 16a covers the first source/drain metal layer 15 and fills the through holes H. The second source/drain metal layer 17 is located on the second planarization layer 16b. The second source/drain metal layer 17 comprises a connecting electrode 17a, a second part 204b of the first power lines 204, and a third portion 204c of the first power lines 204, wherein the first portion 204a of the first power lines 204 and the second portion 204b of the first power lines 204 are connected by a first via h1. The second planarization layer 16b is disposed on the first planarization layer 16a, and the second planarization layer 16b covers the second source/drain metal layer 17.

In the embodiment of the present disclosure, the first part 204a of the first power line 204 and the second part 204b of the first power line 204 are connected through the first via h1. Since the first power line 204 is entirely a signal source, arranging the first power line 204 in different layers could reduce loading. In addition, the arrangement of the first power line 204 and the display signal line 202 in different layers could simplify the routing of the data/signal lines, and in the meanwhile reduce a frame size of the display panel 200, thereby realizing a narrow frame design.

In some embodiments, the substrate 10 comprises, stacked in sequence, a first flexible layer 10a, a first barrier layer 10b, a second flexible layer 10c, a second barrier layer 10d, and a buffer layer 10e. The first barrier layer 10b is used to prevent water and oxygen from penetrating to the structure above the first barrier layer 10b from one side of the first flexible layer 10a, so as to prevent damage to the display panel 200. In some embodiments, the materials of the first barrier layer 10b, the second barrier layer 10d, and the buffer layer 10e include, but are not limited to, silicon-containing oxide, nitride, or oxynitride. For example, the material of the first barrier layer 10b is at least one of SiOx, SiNx, or SiOxNy. The material of the first flexible layer 10a can be the same as the material of the second flexible layer 10c, which can include PI (polyimide), PET (polyethylene dicarboxylate), PEN (polyethylene naphthalate), PC (polycarbonate), PES (polyethersulfone), PAR (aromatic fluorotoluene containing polyarylate) or PCO (polycyclic olefins). The buffer layer 10e may be a silicon nitride layer and a silicon oxide layer arranged in a stack, wherein the silicon nitride layer is used to block an invading of water and oxygen from one side of the second flexible layer 10c, which will damage the layers above the display panel 200. The silicon oxide layer is used to keep temperature of the thin film transistors above it.

The material of the active layer 11 may be one or any combination of indium gallium zinc oxide, indium zinc tin oxide, or indium gallium zinc tin oxide. Alternatively, the material of the active layer 11 may also be LTPO (Low Temperature Polycrystalline Oxide). The materials of the first gate 13a, the second gate 13b, the first source/drain metal layer 15 and the second source/drain metal layer 17 include silver (Ag), magnesium (Mg), aluminum (Al), tungsten (W), copper (Cu), nickel (Ni), chromium (Cr), molybdenum (Mo), titanium (Ti), platinum (Pt), tantalum (Ta), neodymium (Nd) or scandium (Sc) metals, their alloys, their nitrides, etc., or any combination thereof. The material of the first gate insulating layer 12a, the second gate insulating layer 12b, and the interlayer dielectric layer 14 comprises one or any combination of silicon oxide, silicon nitride, and silicon oxynitride. The material of the first planarization layer 16a and the second planarization layer 16b may be one selected from silicon dioxide, nitrogen dioxide, silicon oxynitride and their laminates or organic materials, such as acrylic resin.

In some embodiments, the through hole H penetrates the interlayer dielectric layer 14, the second gate insulating layer 12b, the first gate insulating layer 12a, the buffer layer 10e and the second flexible Layer 10c. The display signal line 202 covers the sidewall of the through hole H and a part of the bottom of the through hole H.

The first-type signal shielding line 203a is located between the display signal line 202 and the touch signal line 201, and used to reduce the risk of crosstalk between the signals in the display signal line 202 and the touch signal line 201. In some embodiments, the first-type signal shielding line 203a, the display signal line 202, and the touch signal line 201 can be formed in one photolithography process, thereby simplifying the step of producing the first-type signal shielding line 203a, the display signal line 202, and the touch signal line 201.

Further, the first-type signal shielding line 203a is electrically connected to the first power line 204 through the second via hole h2. Specifically, the second via hole h2 penetrates the first planarization layer 16a, and the first-type signal shielding line 203a is electrically connected to the first power lines 204 located on the first source/drain metal layer 15 through the second via hole h2.

It should be noted that when the source and drain of the display panel 200 are designed as a single-layer source and drain, the first power lines 204 and the source/drain layer are provided in the same layer. When the source and drain of the display panel 200 are designed as a double-layer source and drain, that is, when the display panel 200 comprises a first source/drain metal layer and a second source/drain metal layer, the first power lines 204 is arranged in the same layer with the second source/drain metal layer in the bending area, while in the other area is arranged in the same layer with the first source/drain metal layer or the same layer with the first source/drain metal layer and the second source/drain metal layer.

It should be noted that the thin film transistor of the embodiment of the present disclosure may be a bottom gate thin film transistor or a top gate thin film transistor, or a single gate thin film transistor or a double gate thin film transistor. The embodiment of the present disclosure is described by taking a double-gate thin film transistor as an example, but it is not limited thereto.

Further, please continue to refer to FIG. 2, the non-display area NA also comprises a second power line sub-region VSS. The second power line sub-region VSS is located on at least one side of the first power line sub-region VDD. There are a plurality of second power lines 206 distributed in the second power line sub-region VSS. The touch signal line 201 comprises a first-type touch signal line 201a and a second-type touch signal line 201b. The first-type touch signal line 201a is connected to a touch-control chip 205 through the space above the first power line sub-region VDD. The second-type touch signal line 201b is connected to the touch-control chip 205 through the space above the second power line sub-region VSS.

It should be noted that the first power lines in the embodiment of the present disclosure may be a VDD trace (a high-voltage power line). The second power lines can be a VSS trace (low voltage power line).

In some embodiments, the display panel 200 further comprises a touch-control chip 205 and a control chip 207. The touch-control chip 205 is located on the side of the non-display area NA away from the display area AA, and the touch-control chip 205 is connected to the touch signal line 201. The touch-control chip 205 is used to provide touch signals to the touch signal line 201. The control chip 207 is located on the side of the non-display area NA away from the display area AA. The control chip 207 is connected to the display signal line 202 and the first power line 204. The first-type signal shielding line 203a is e connected to the control chip 207 through the first power line 204. The control chip 207 is used to provide a display signal to the display signal line 202 and a fixed voltage signal to the first power line 204. Since the first-type signal shielding line 203a is electrically connected to the control chip 207 through the first power line 204, the control chip 207 is used to provide display signals to the display signal line 202 and a fixed voltage signal to the first power line 204. Therefore, there is no need to connect the first-type signal shielding line 203a to the touch-control chip 205, which reduces the number of pads for connecting into the touch-control chip 205, thereby reducing the production cost of the display panel 200 and improving the process yield.

In some embodiments, the touch-control chip 205 comprises a first touch-control chip 205a and a second touch-control chip 205b, and the first touch-control chip 205a and the second touch-control chip 205b are located on both sides of the control chip 207. The first-type touch signal line 201a and the second-type touch signal line 201b located on one side of the center line P of the display panel 200 are connected to the first touch-control chip 205a. The first-type touch signal line 201a and the second-type touch signal line 201b located on the other side of the center line P of the display panel 200 are connected to the second touch-control chip 205b. In the embodiment of the present disclosure, the touch-control chip 205 is arranged on both sides of the control chip 207, so that the touch signal lines on one side of the center line P of the display panel 200 are connected to a same touch-control chip 205. This arrangement shortens the length of the touch signal lines and avoids the risk of short circuit of the display panel 200.

It should be noted that in some embodiments, the display panel 200 comprises at least one touch-control chip 205. When the number of the touch-control chip 205 is one, the lines on one side of the display panel 200 are routed to another side by a crossover method, and connected to the same touch-control chip 205. The embodiment of the present disclosure is described by taking the display panel 200 including two touch-control chips as an example, but it is not limited thereto.

When the display panel 200 is a large-size display panel, the number of touch-control chips 205 may be one of three, four, five, or six.

It should be understood that the center line P in the embodiment of the present disclosure is artificially divided for the convenience of explanation.

In some embodiments, the display panel 200 further comprises a second-type signal shielding line 203b. The second-type signal shielding line 203b is located in the non-display area NA and arranged around the display area AA. A first end of the second-type signal shielding line 203b is connected to the first touch-control chip 205a, and a second end of the second-type signal shielding line 203b is connected to the second touch-control chip 205b. The second-type signal shielding line 203b is arranged around the display area AA to shield the signal interference between the touch signal line 201 and the peripheral display signal line. The two ends of the second-type signal shielding line 203b are respectively connected to the first touch-control chip 205a and the second touch-control chip 205b, and thus have the same signal as the touch-control chip 205, the voltage difference therebetween being zero and the signal therebetween being not interfered.

In some embodiments, the second-type signal shielding line 203b can also be connected to the ground. The signal lines of a peripheral circuit line will be consumed due to the connection of the second-type signal shielding line 203b to the ground and thus will not affect the circuit to be protected.

Further, the display panel 200 further comprises a plurality of touch units 208. The touch units 208 are arranged in the display area AA. One end of the touch signal line 201 away from the touch-control chip 205 is connected to the touch unit 208. The touch signal lines 201 and the touch units 208 are connected in a one-to-one correspondence. The touch unit 208 in the embodiment of the present disclosure may be a self-capacitive touch unit or a mutual-capacitive touch unit. A touch unit 208 is wired with at least one touch signal line 201. The touch signal lines 201 constitutes a touch-control routing area. In the display area AA, the touch signal lines 201 in the touch-control routing area are symmetric about the center line P. For example, on the left side of the center line P, the touch-control routing area of the corresponding touch sensing chain is set on the left side of the touch sensor chain. On the right side of the center line P, the touch-control routing area of the corresponding touch sensing chain is set on the right side of the touch sensor chain. In more detail, the touch-control routing area corresponding to the touch sensor chain on the leftmost side of the center line P is set in the left frame area. The touch-control routing area corresponding to the touch sensor chain on the far right of the center line P is set in the right frame area. The touch signal lines in the left frame area and the right frame area extend down to the lower frame area and gather in the lower frame area. The gathered touch signal lines 201 are routed above the second power line sub-region VSS. The touch-control routing area of the display area AA extends longitudinally to the lower frame area and gathers in the lower frame area to form a second routing area. The second routing area is set above the first power line sub-region VDD. In the display area AA, on the left side of the center line P, the touch-control routing area corresponding to the touch sensor chain is set on the left side of the touch sensor chain. In the display area AA, on the right side of the center line P, the touch-control routing area corresponding to the touch sensor chain is set on the right side of the touch sensor chain. In the display area AA, the touch signal lines in the touch-control routing area extend longitudinally to the lower frame area and gather in the lower frame area to form a second routing area.

In some embodiments, the first-type signal shielding line 203a is arranged in parallel with the display signal line 202. By arranging the first-type signal shielding line 203a in parallel with the display signal line 202, the risk of signal crosstalk between the display signal line 202 and the first-type touch signal line 201a will be further reduced.

It should be noted that the display panel 200 may be an organic light emitting diode display panel, a micro light emitting diode display panel, or a mini light emitting diode display panel. The specific type of the display panel 200 is not limited in the present disclosure.

Please refer to the embodiment of the present disclosure. An electronic device 1000 may be a display device such as a mobile phone, a tablet, a notebook computer, and a TV. The electronic device 1000 comprises a housing 300 and a display panel provided in the housing 300. The display panel may be the display panel 200 described in the above embodiment. The specific structure of the display panel 200 can refer to the description of the aforementioned embodiment, which will not be repeated here.

The embodiment of the present disclosure provides a display panel and an electronic device. The display panel comprises a plurality of touch signal lines, a plurality of display signal lines, a plurality of first-type signal shielding lines, and a plurality of first power lines. Specifically, the touch signal lines are located in the display area and the non-display area. The display signal lines are located in the display area and the non-display area. The first-type signal shielding lines are arranged in the non-display area, and the first-type signal shielding line is located between the touch signal line and the display signal line. The first power line is located in the display area and the non-display area, and the first power line is connected to a fixed voltage signal, and the first-type signal shielding line is connected to the first power line on both sides of the bending sub-area. In the display panel provided in the embodiment of the present disclosure, by means of arranging the first-type signal shielding line between the touch signal line and the display signal line, connecting the first-type signal shielding line to a Fixed voltage signal, and arranging the first-type signal shielding line to be electrically connected to the first power line on both sides of the bending sub-area, the first-type signal shielding line and the first power line have the same voltage signal, and there is no need to add pad to connect the first signal shielding line into the control chip or the touch-control chip. Furthermore, since the first power line is connected to a DC signal source, the corresponding capacitance and voltage difference thereof are constant, so the corresponding signal interference is constant. Therefore, the signal interference can be removed through the chip, and effective signal data can be retained, thereby preventing signal crosstalk between the display signal line and the touch signal line. In addition, the number of pads for connecting into the touch-control chip is reduced, thereby reducing the production cost of the display panel and improving the process yield.

In summary, although the present disclosure has been disclosed as above with the preferred embodiments, the above-mentioned preferred embodiments are not intended to limit the application. For all of ordinary skill in the art, various changes and modifications can be made without departing from the spirit and scope of the present disclosure. Therefore, the protection scope of the present disclosure is subject to the scope defined by the claims.

What is claimed is:

1. A display panel having a display area and a non-display area, the non-display area comprising a bending sub-area, wherein the display panel comprises:
- a plurality of touch signal lines that are located in the display area and the non-display area;
- a plurality of display signal lines that are located in the display area and the non-display area;
- a plurality of first-type signal shielding lines that are arranged in the non-display area, each of the first-type signal shielding line being located between the touch signal line and the display signal line; and,
- a plurality of first power lines that are located in the display area and the non-display area and are connected to a fixed voltage signal;
- wherein, the first-type signal shielding lines are electrically connected to the first power lines respectively on both sides of the bending sub-area.

2. The display panel according to claim 1, wherein the non-display area comprises a first power line sub-region, and the first power line is located in the first power line sub-region, spaced from part of the touch signal lines and the display signal lines which are located in the power line sub-region, and in a same layer with parts of the display signal line and the touch signal line which are located in the bending sub-area.

3. The display panel according to claim 2, wherein at least parts of the first-type signal shielding line, the touch signal line, and the display signal line are arranged in the same layer.

4. The display panel of claim 3, wherein the display panel comprises:
- a substrate;
- an active layer, a first gate insulating layer, a first gate, a second gate insulating layer, a second gate and an interlayer dielectric layer which are stacked in sequence, wherein the interlayer dielectric layer is provided with a through hole, and the through hole penetrates at least the interlayer dielectric layer, the second gate insulating layer and the first gate insulating layer, and the display signal line covers at least a part of the side wall of the through hole;
- a first source/drain metal layer being disposed on the interlayer dielectric layer, the first source/drain metal layer comprising a source electrode, a drain electrode, and a first part of the first power line;
- a first planarization layer covering the first source/drain metal layer and filling the through hole;
- a second source/drain metal layer that is located on the first planarization layer and comprises a connecting electrode, a second part of the first power line, a third part of the first power line, wherein the first part of the first power line and the second part of the first power line are connected by a first via; and
- a second planarization layer being disposed on the first planarization layer.

5. The display panel of claim 4, wherein the first-type signal shielding line is electrically connected to the first power line through a second via hole.

6. The display panel of claim 1, wherein the display panel further comprises:
- a touch-control chip that is located on one side of the non-display area away from the display area, connected to the touch signal line, and used for providing a touch signal to the touch signal line; and
- a control chip that is located on one side of the non-display area away from the display area, wherein the control chip is connected to the display signal line and the first power line, the first-type signal shielding line is electrically connected to the control chip through the first power line, and the control chip is used to provide a display signal for the display signal line and the fixed voltage signal for the first power line.

7. The display panel of claim 6, wherein the non-display area comprises:
- a second power line sub-region that is located on at least one side of the first power line sub-region and distributed with a plurality of second power lines.

8. The display panel of claim 7, wherein the touch signal lines comprise a first-type touch signal line and a second-type touch signal line, and the first-type touch signal line is connected to the touch-control chip over the first power line sub-region, and the second-type touch signal line is connected to the touch-control chip over the second power line sub-region.

9. The display panel according to claim 8, wherein the touch-control chip comprises a first touch-control chip and a second touch-control chip, the first touch-control chip and the second touch-control chip are located on both sides of the control chip, the first-type touch signal lines and the second-type touch signal lines located on one side of the center line of the display panel are connected to the first touch-control chip, and the first-type touch signal lines and the second-type touch signal lines located on the other side of the center line of the display panel are connected to the second touch-control chip.

10. The display panel of claim 9, wherein the display panel further comprises:
- a second-type signal shielding line that is located in the non-display area and arranged around the display area, wherein a first end of the second-type signal shielding line is connected to the first touch-control chip, and a second end of the second-type signal shielding line is connected to the second touch-control chip.

11. The display panel of claim 6, wherein the display panel further comprises:
- a plurality of touch units that are arranged in the display area, wherein the ends of the touch signal lines away from the touch-control chip are connected to the touch units, and the touch signal lines are connected to the touch units in a one-to-one correspondence.

12. The display panel of claim 1, wherein the first-type signal shielding line is arranged in parallel with the display signal line.

13. An electronic device, wherein the electronic device is provided with a display panel and a housing, the display panel is disposed in the housing, and the display panel comprises:
- a plurality of touch signal lines that are located in the display area and the non-display area;
- a plurality of display signal lines that are located in the display area and the non-display area;
- a plurality of first-type signal shielding lines that are arranged in the non-display area, each of the first-type signal shielding line being located between the touch signal line and the display signal line; and
- a plurality of first power lines that are located in the display area and the non-display area and are connected to a fixed voltage signal;

wherein, the first-type signal shielding lines are electrically connected to the first power lines respectively on both sides of the bending sub-area.

14. The electronic device according to claim 13, wherein the non-display area comprises a first power line sub-region, and the first power line is located in the first power line sub-region, spaced from part of the touch signal lines and the display signal lines which are located in the power line sub-region, and in a same layer with parts of the display signal line and the touch signal line which are located in the bending sub-area.

15. The electronic device according to claim 14, wherein at least parts of the first-type signal shielding line, the touch signal line, and the display signal line are arranged in the same layer.

16. The electronic device of claim 15, wherein the display panel comprises:
   a substrate;
   an active layer, a first gate insulating layer, a first gate, a second gate insulating layer, a second gate and an interlayer dielectric layer which are stacked in sequence, wherein the interlayer dielectric layer is provided with a through hole, and the through hole penetrates at least the interlayer dielectric layer, the second gate insulating layer and the first gate insulating layer, and the display signal line covers at least a part of the side wall of the through hole;
   a first source/drain metal layer being disposed on the interlayer dielectric layer, the first source/drain metal layer comprising a source electrode, a drain electrode, and a first part of the first power line;
   a first planarization layer covering the first source/drain metal layer and filling the through hole;
   a second source/drain metal layer that is located on the first planarization layer and comprises a connecting electrode, a second part of the first power line, a third part of the first power line, wherein the first part of the first power line and the second part of the first power line are connected by a first via; and
   a second planarization layer being disposed on the first planarization layer.

17. The electronic device according to claim 16, wherein the first-type signal shielding line is electrically connected to the first power line through a second via hole.

18. The electronic device of claim 13, wherein the display panel further comprises:
   a touch-control chip that is located on one side of the non-display area away from the display area, connected to the touch signal line, and used for providing a touch signal to the touch signal line; and
   a control chip that is located on one side of the non-display area away from the display area, wherein the control chip is connected to the display signal line and the first power line, the first-type signal shielding line is electrically connected to the control chip through the first power line, and the control chip is used to provide a display signal for the display signal line and the fixed voltage signal for the first power line.

19. The electronic device of claim 18, wherein the non-display area comprises:
   a second power line sub-region that is located on at least one side of the first power line sub-region and distributed with a plurality of second power lines.

20. The electronic device of claim 19, wherein the touch signal lines comprise a first-type touch signal line and a second-type touch signal line, and the first-type touch signal line is connected to the touch-control chip over the first power line sub-region, and the second-type touch signal line is connected to the touch-control chip over the second power line sub-region.

* * * * *